United States Patent
Steinborn

(10) Patent No.: US 6,953,185 B2
(45) Date of Patent: Oct. 11, 2005

(54) ELECTROMAGNETICAL CLUTCH, ELECTROMECHANICAL ACTUATOR AND TURBINE

(75) Inventor: Richard Steinborn, Mülheim an der Ruhr (DE)

(73) Assignee: Siemens Aktiengesellschaft, Munich (DE)

(*) Notice: Subject to any disclaimer, the term of this patent is extended or adjusted under 35 U.S.C. 154(b) by 105 days.

(21) Appl. No.: 10/433,062

(22) PCT Filed: Sep. 25, 2002

(86) PCT No.: PCT/EP02/10767
§ 371 (c)(1),
(2), (4) Date: Oct. 9, 2003

(87) PCT Pub. No.: WO03/029679
PCT Pub. Date: Apr. 10, 2003

(65) Prior Publication Data
US 2004/0076509 A1 Apr. 22, 2004

(30) Foreign Application Priority Data
Oct. 1, 2001 (GB) .............................................. 0123469

(51) Int. Cl.⁷ ........................ F16D 27/102; F16K 31/04
(52) U.S. Cl. ............................................... 251/129.11
(58) Field of Search ...................... 251/129.11–129.13

(56) References Cited

U.S. PATENT DOCUMENTS 5,427,345 A * 6/1995 Yamakami et al. ......... 248/394
5,505,285 A * 4/1996 Organek ...................... 192/35
5,819,883 A * 10/1998 Organek et al. ........... 188/71.5
6,148,979 A   11/2000 Roach et al.
6,186,300 B1 * 2/2001 Bauer et al. ............... 192/48.4
6,851,532 B2 * 2/2005 Back et al. .................. 192/3.3

FOREIGN PATENT DOCUMENTS

| DE | 1 937 198 | 2/1971 |
| DE | 37 06 621 | 9/1987 |
| DE | 44 46 605 | 6/1996 |
| EP | 0 040 732 | 12/1981 |
| EP | 0 230 849 | 1/1986 |
| WO | 98/13633 | 4/1998 |
| WO | 99/49250 | 9/1999 |

* cited by examiner

Primary Examiner—J. Casimer Jacyna
(74) Attorney, Agent, or Firm—Harness, Dickey & Pierce, P.L.C.

(57) ABSTRACT

An electromagnetical radial lamella clutch is for an electromechanical actuator, in particular for a valve. The clutch includes a rotor element having an axis of rotation and a circumferential outer surface area with at least one recess. The rotor element is surrounded by a cylindrical element, whereby at least one lamella element is fastened to the cylindrical element. The lamella element includes an insertion portion being placed in the recess, whereby an electrical coil holds the lamella element in the recess. An electromechanical actuator may further include the electromagnetical radial lamella clutch. Further, a turbine including a valve, may be operated by the electromechanical actuator.

21 Claims, 4 Drawing Sheets

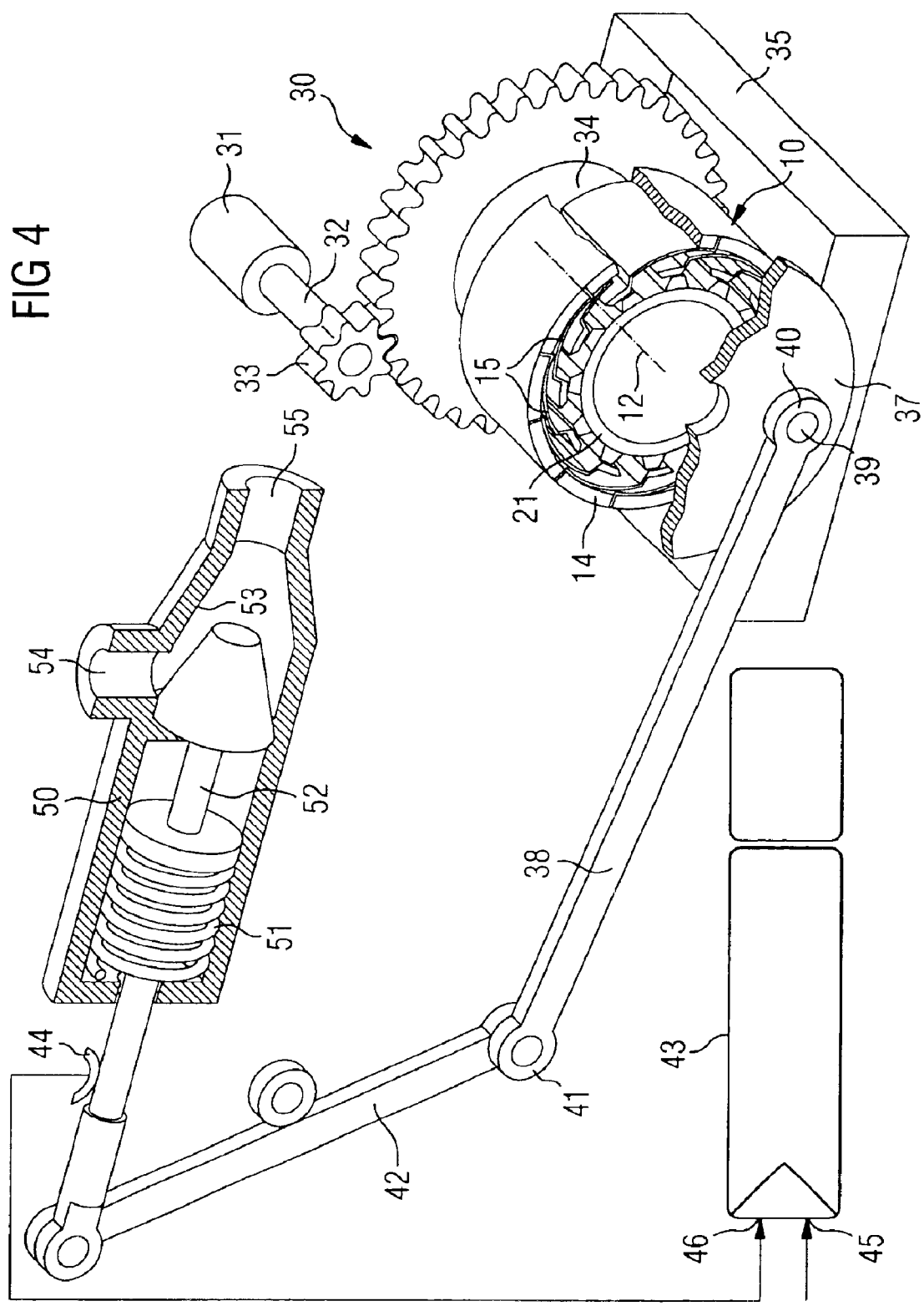

ELECTROMAGNETICAL CLUTCH, ELECTROMECHANICAL ACTUATOR AND TURBINE

This application is the national phase under 35 U.S.C. § 371 of PCT International Application No. PCT/EP02/10767 which has an International filing date of Sep. 25, 2002, which designated the United States of America and which claims priority on Great Britain patent application number GB 0123469.9 filed Oct. 1, 2001, the entire contents of which are hereby incorporated herein by reference.

FIELD OF THE INVENTION

The invention generally pertains to an electromagnetical clutch for an electromechanical actuator. The invention further generally relates to an electromechanical actuator for a valve having a valve piston and an electrical motor. The invention also generally pertains to a turbine. In particular, it relates to a steam turbine having a valve for regulating the flow of a fluid, with a valve piston being connected to an electromechanical actuator.

BACKGROUND OF THE INVENTION

A turbine, particularly a steam turbine, generally has a large number of valves that can be used as fresh steam valves, interception valves or diversion valves. The opening position of each of the valves serves the purpose of regulating a respective material charge or steam charge and can be generally regulated with the help of a transmission member, in particular a part of a valve actuator, allocated to the respective valve. The requirements on the valve in terms of specifications have to be particularly high with respect to regulating power and regulating speed.

To ensure a secure operation or closure of the valve, in particular in an emergency shutdown of a steam turbine, valves can be configured as oil-hydraulic driven servo valves, whereby the actuators allocated to them in each case include an oil-hydraulic unit either with a central hydraulic supply system or a de-centralised hydraulic supply system as described in European Patent Application EP 0 040 732 A1. Due to improvements in electrical motors with respect to reliability and momentum also a servo valve for regulating of pressure and/or quantity of charging medium can be used as for example described in German Patent Application DE-OS 19 37 198 relating to atomic plants, chemical plants and similar plants. The servo valve described therein has a push rod on which a valve seat is fixed. The push rod is coupled with an electrical servo motor over a beam rotatable around a central fulcrum. In this way the quantity of charging medium can be regulated through the valve. A return spring grips on to the push rods.

In EP 0 230 849 A1, a servo valve and a stop valve are described. The servo valve has a locking body that can be shifted along an axis, which also has a piston stretching along the axis. The piston is configured as a straightgeared rack that stays in contact with the longitudinal gearing of another rod. By rotating the rod round its rod axis, one can achieve shifting of the locking body in a axial direction. Rotation of the rod takes place with the help of another toothing at the end of the rod via an electrical motor.

In DE 44 46 605A1, a valve for a steam turbine is described which has a valve spindle with a sealing seat disposed against it. The valve spindle is driven by an electrical motor that is connected to the valve spindle through an electromagnetically activated coupling. For an automatic servo-closing of the valve, this includes a plate spring system.

In International publication WO 98/13633 A1, an actuator for a turbine valve whose opening position can be adjusted by way of the connecting rod, such that interference-free operation of the valve is ensured with a particularly low fire-risk is described. The actuator includes an electrical motor for driving the connection rod. The connecting rod is connected to the electrical motor via a rack and pinion system and via an electromagnetic tooth coupling.

International publication WO 99/49250 A1 describes an electromechanical actuator for a valve, in particular a steam turbine. The actuator has a connecting rod and an electrical motor for driving the connecting rod. The connecting rod is connected to the electrical motor through a transmission device producing a torque, which can vary according to axial displacement of the connecting rod. The connecting rod is connected to a crank disk which itself is connected via a tooth coupling with the electrical motor.

SUMMARY OF THE INVENTION

It is accordingly an object of an embodiment of the invention to provide a space saving, fast acting and rather inexpensive electromagnetic clutch for an electromechanical actuator. It is a further object of an embodiment of the invention to provide an electromechanical actuator for a valve and a turbine, in particular a steam turbine having a valve for regulating the flow of a fluid which is operated through an electromechanical actuator.

With the foregoing and other objects in view there is provided, in accordance with an embodiment of the invention, an electromagnetical radial lamella clutch for an electromechanical actuator, in particular for a valve. The clutch includes a rotor element having an axis of rotation and a circumferential outer surface area with at least one recess. A cylindrical element surrounds the rotor element and at least one lamella element is fastened to the cylindrical element and having an insertion portion for being placed in the recess.

The clutch further includes an electrical coil for holding the at least one lamella element in the recess. The clutch preferably includes a plurality of radial lamellas which are almost flat, flexible and single lamellas, which are situated between the cylindrical element and the rotor element. The lamella element is preferably fastened and secured in the cylindrical element with one end, whereby the other end having the insertion portion is placed in the recess by electromagnetical forces due to an electromagnetical field produced by the electrical coil. In case the insertion portion is placed in the recess the clutch is in operation so that by rotating the rotor element, which is coupled to the electrical motor, also the cylindrical element is forced to rotate. This rotation of the cylindrical element can be transformed into an axial movement of a piston rod of a valve.

In accordance with another feature the at least one lamella element is pre-stressed for mechanically inserting the insertion portion into the recess. By pre-stressing the lamella element so that it is normally placed in the recess, the insertion portion—on which the electromechnical force produced by the coil acts—is in close neighbourhood to the recess. In case the electrical circuit of the electrical coil is interrupted, for example in the shutdown of a steam turbine with an immediate closure of a steam turbine valve required, the electromagnetical force attracting and holding the insertion portion in the recess vanishes. So through a rotation of the rotor element the insertion portion is forced out of the recess and the positive-fit and force-fit connection between rotor element and the cylindrical element is cancelled. As soon as the rotation of the rotor element comes to a stand still the insertion portion is again inserted into the recess in a positive-fit due to the pre-stressed arrangement of the lamella element.

In accordance with a further feature, the insertion portion includes a magnetic material. The magnetic flux of the coil is increased, when the insertion portion is provided with a magnetic material. This leads to an improved forced-fit as the electromagnetical force acting on the insertion portion is increased in this way. The insertion portion may consist of a magnetic material or may have a covering layer of a magnetic material.

In accordance with an added feature, the coil is wound around the rotor element.

In accordance with an additional feature, the recess has a bottom section and a rising edge and the insertion portion contacts at least partially the bottom section and the edge. A geometrical design both of the recess and the insertion portion so that they make a close positive-fit increases the momentum which can be transmitted by the clutch. The slope of the rising edge, which influences the force of attraction and the release safety of the clutch, is chosen according to the requirements of the clutch.

In accordance with yet another feature, the rising edge merges into a top section of the surface area, whereby the insertion portion preferably also contacts at least partially the top section. In this way the positive-fit between the surface area, in particular the recess and the lamella element is further improved.

In accordance with an added feature, the recess is a spacing between two teeth elements. The teeth elements, in particular a plurality of teeth elements, are distributed preferably along the circumference of the rotor element thereby forming the circumferential outer surface with at least one recess. The rotor element may then have the form of a gear wheel or a tooth wheel.

According to another object of an embodiment of the invention there is provided an electromechanical actuator for a valve having a valve piston and comprising an electrical motor, an electromagnetical radial lamella clutch and a push rod being connected with one end with a crank disk of the clutch and being connectable with the other end to the valve piston of the valve. The radial electromagnetical clutch includes a rotor element having an axis of rotation and a circumferential outer surface area with at least one recess and being connectable to the electrical motor. It further includes a cylindrical element surrounding the rotor element, at least one lamella element fastened to that cylindrical element and having an insertion portion for being placed in the recess. The clutch includes in addition an electrical coil for holding the lamella element into the recess and a crank disk connected to the cylindrical element.

The electromechanical actuator is capable of performing a certain, instantaneous closure of the valve, for example in the case of a sudden shut off of a steam turbine, in de-coupling the rotor element and the cylindrical element. by using the electromagnetical attracted radial lamella clutch. The rotor element can be connected to that electrical motor and the cylindrical element to the valve piston. The de-coupling is performed by interrupting the electrical circuit of the electrical coil generating the electromagnetical force, which attracts the lamella elements. By de-coupling the lamella element from the rotor element the rotational speed of the cylindrical element is so high that by the centrifugal force acting on the lamellas, the lamella elements lift-off the recess against the mechanical force established by pre-stressing of the lamella elements. This de-coupling enables the valve to come into a closing position. In case of a stand still of the cylindrical element a mechanical force due to a pre-stressing of the lamellas comes into action again and the lamella elements engage again in a positive-fit in the recess. In case of a sudden closure of a valve the cylindrical element comes to a stand still when the valve reaches a closing position and the electrical motor is switched off.

In accordance with yet an additional feature, the electrical motor is connectable to the rotor element by a gearing, in particular a multi-stage gearing.

In accordance with a concomitant feature, the actuator includes an oil reservoir and the clutch is connected to a damping device, whereby the damping device is at least partially immerged into that oil reservoir. The damping device may be a damping disk connected to the cylindrical element or in a preferred embodiment the cylindrical element itself forms the damping device, in particular the outer surface of the cylindrical element is at least partially immerged into the oil reservoir. A damping disk or the cylindrical element may have on its outer circumference a fin or the like which leads to an increased damping co-efficient. Preferably the electrical motor and the crank disk are positioned outside of the oil reservoir. The oil reservoir is preferably filled with unpressurized oil. The damping device provides a damping which is of particular interest in case of a sudden closure of the valve to protect the valve seat from damage. Due to the damping even in the case of a sudden closure of the valve the motion of the valve piston is slowed down in the vicinity of the valve seat before the valve piston comes into contact with the valve seat.

In accordance with again another feature, the actuator includes a rocker arm which is connected at one side to the push rod and connectable on the other side to valve piston. Using a rocker arm allows a space saving arrangement of the actuator and the valve and furthermore by choosing different arm lengths of the rocker arm levels, it is possible by imposing a small force through the actuator on the respective rocker arm lever to move the valve piston against a valve spring which by being compressed creates a higher spring force.

In accordance with again a further feature, the actuator is connected to a valve having a valve piston, which is forced by a valve spring into a closed position and is to be opened against a spring force of that valve spring. The valve is preferably a valve of a turbine in particular a steam turbine. The actuator connected to this valve serves both for normal operation, this refers to closing and opening the valve for adjusting the stream of steam during normal operation of the turbine as well as the sudden shut off of the steam supply to the turbine.

In accordance with another object of an embodiment of the invention, a turbine, in particular a steam turbine having a valve for regulating the flow of the fluid, includes a valve which includes a valve piston and is connected to an electromechanical actuator as described above.

Also, although embodiments of the invention are illustrated and described herein as embodied in an electromagnetical radial lamella clutch, an electromechanical actuator for a valve having a valve piston, an electrical motor and a radial electromagnetical lamella clutch in particular in a steam turbine, and a turbine, in particular a steam turbine, it is nevertheless not intended to be limited to the details shown, since various modifications and structural changes may be made therein without departing from the spirit of the invention and within the scope and range of disclosures of the claims.

BRIEF DESCRIPTION OF THE DRAWINGS

The construction of the invention, however, together with additional objects and advantages thereof will be best understood from the following description of specific embodiments when read in conjunction with the accompanying drawings.

FIG. 4 shows the actuator according to FIG. 3 with the valve in an open position.

In the figures of the drawings, components corresponding to one another of the respectively shown exemplary embodiments in each case have the same reference numerals. The drawings are partially simplified in order to emphasis certain features of the invention.

DETAILED DESCRIPTION OF THE PREFERRED EMBODIMENTS

Figure 1:
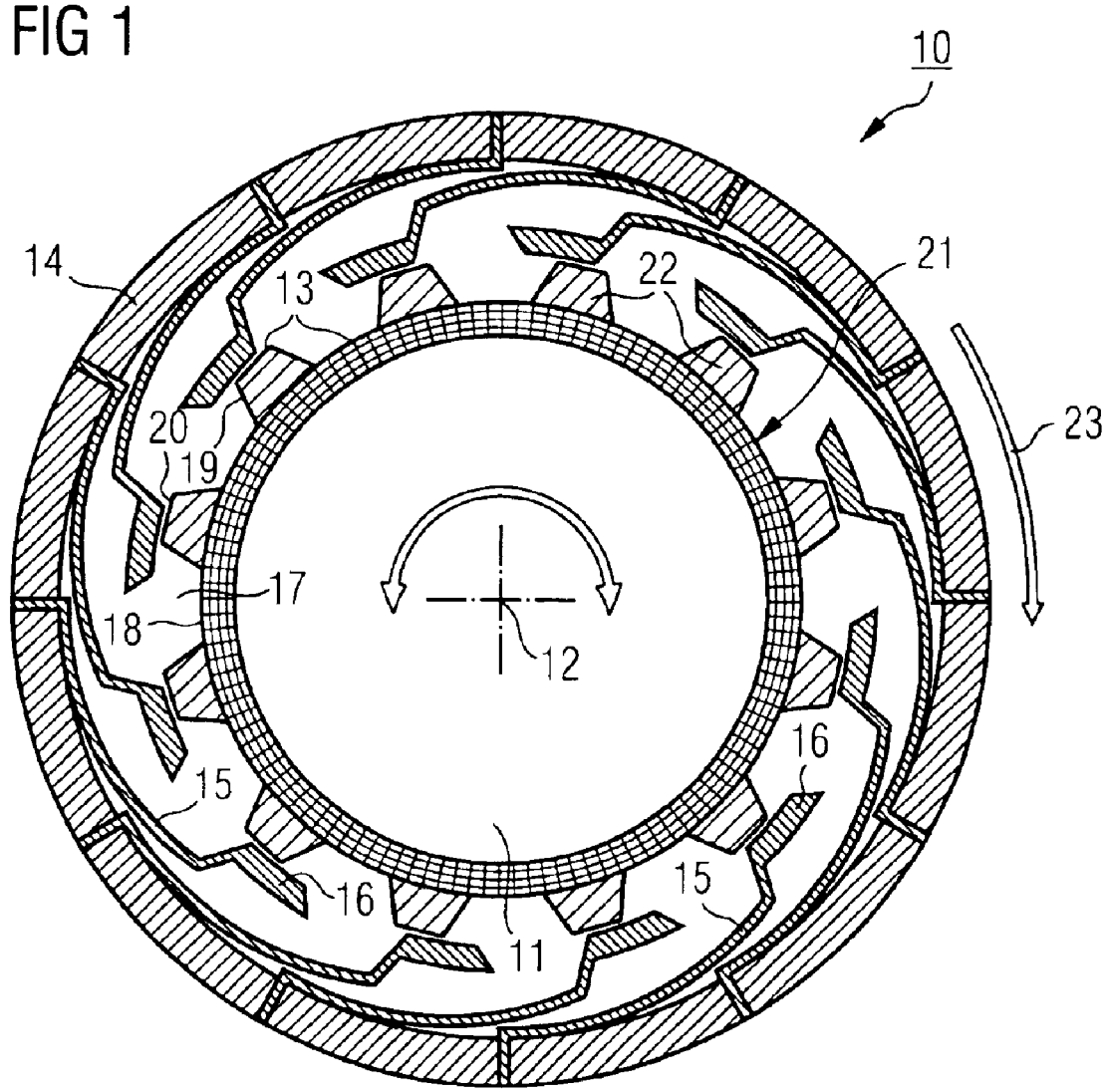
FIG. 1 is a cross-sectional view of an electromagnetical radial lamella clutch in an opening position.

Referring now to the figures of the drawings in detail and first, particularly to FIG. 1 thereof, there is shown an exemplary embodiment of an electromagnetical radial lamella clutch 10 in a cross-sectional view in an open position. The clutch 10 extends along an axis 12 of rotation perpendicular to the plane of FIG. 1. The clutch 10 comprises an rotor element 11 on which an electrical coil 21 is wound. The rotor element 11 including the electrical coil 21 has an circumferential outer surface area 13. This circumferential outer surface area 13 is formed by a plurality of teeth elements 22 which are homogeneously distributed on the circumference of the rotor element 11.

Between each two adjacent teeth elements 22 a recess 17 is formed, which recess 17 has a bottom section 18 and rising edge 19 formed by an edge of teeth 22. The rising edge 19 merges into a top section 20 of a teeth element 22. The rotor element 11 is surrounded by a cylindrical element 14, which is also rotatable around the axis 12 of rotation.

At the inner surface of the cylindrical element 14 a plurality of flexible lamella elements 15 are homogeneously distributed and fastened to the cylindrical element 14. Each elamella element 15 has an insertion portion 16 which has such a geometrical form for being engaged in the recess 17. In particular each insertion portion 16 has a shape for being in a positive-fit contact with the bottom section 18, the rising edge 19 and top section 20. In the embodiment shown in FIG. 1 the lamella clutch 10 is in a open state, whereby the cylindrical element 14 is rotating clockwise as indicated by arrow 23. Due to the rotation and to the fact that the electrical coil 21 is not energised, so it does not attract the insertion portion 16 by electromagnetical force, the insertion portions 16 are forced by the centrifugal force and the rotating teeth elements 22 out of the recess 17. So no momentum and rotational displacement is transmitted by the lamella clutch 10.

Figure 2:
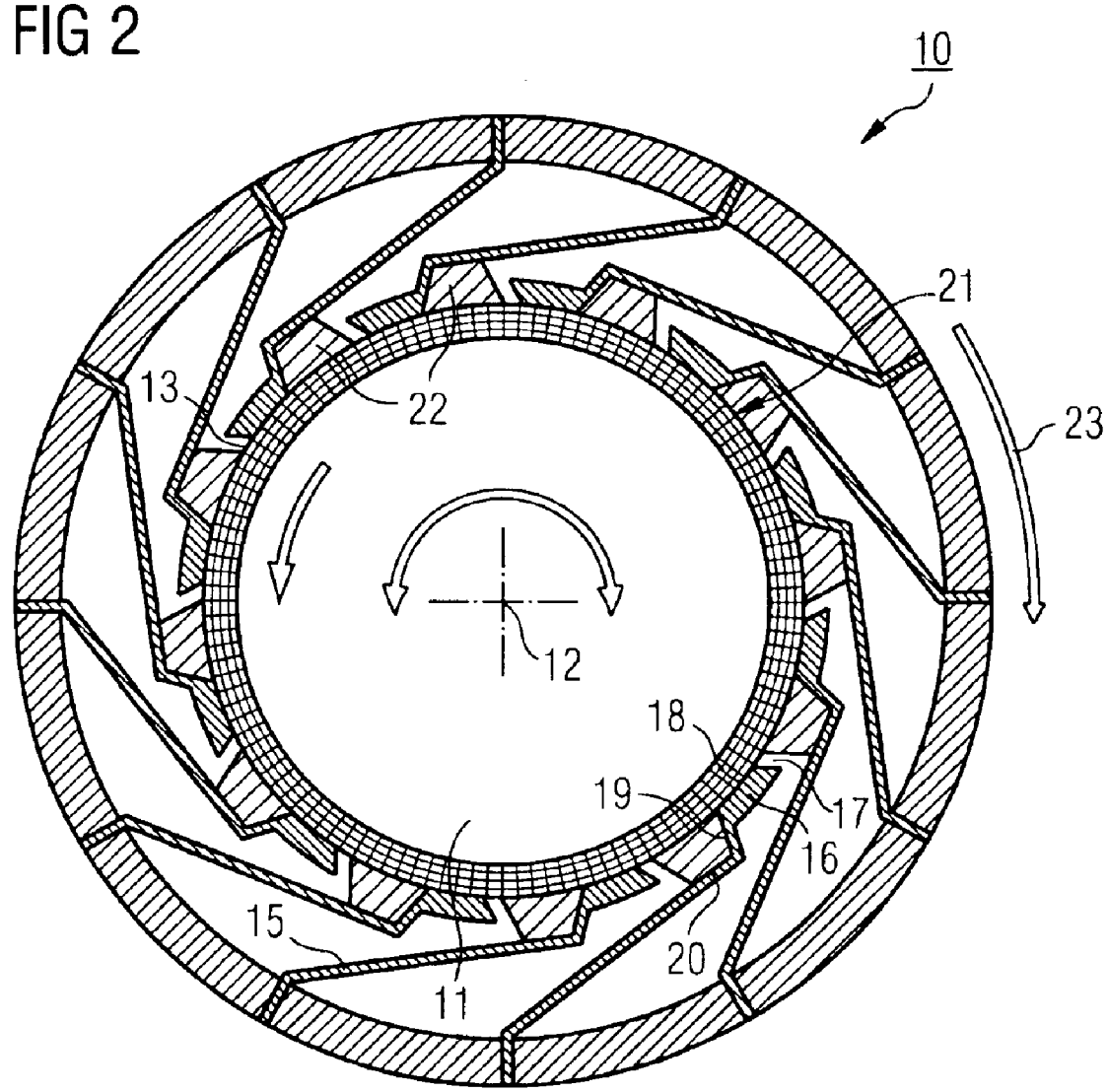
FIG. 2 is a cross-sectional view of an electromagnetical radial lamella clutch in a closed position.

In FIG. 2 a cross-sectional view of a electromagnetical radial lamella clutch 10 like the one of FIG. 1 is shown in a closed or contact state, wherein the insertion portion 16 of each lamella element 15 is engaged with the recess 17 of the rotor element 11. The insertion portion 16 is in a positive-fit contact with the bottom section 18 and the rising edge 19. In this closed or contact state the clutch 10 is capable to transmit a torque or momentum imposed on the rotor element 11 to the cylindrical element 14. The insertion portion 16 is held in the contact position within the recess 17 by an electromagnetical force generated by the electrical coil 21. To increase the magnetic flux of the electric coil 21 the insertion portion 16 includes a magnetic material. Each lamella element 15 is pre-stressed, so that even without electromagnetical force acting on it, it is forced by a mechanical force in the recess 17.

Figure 3:
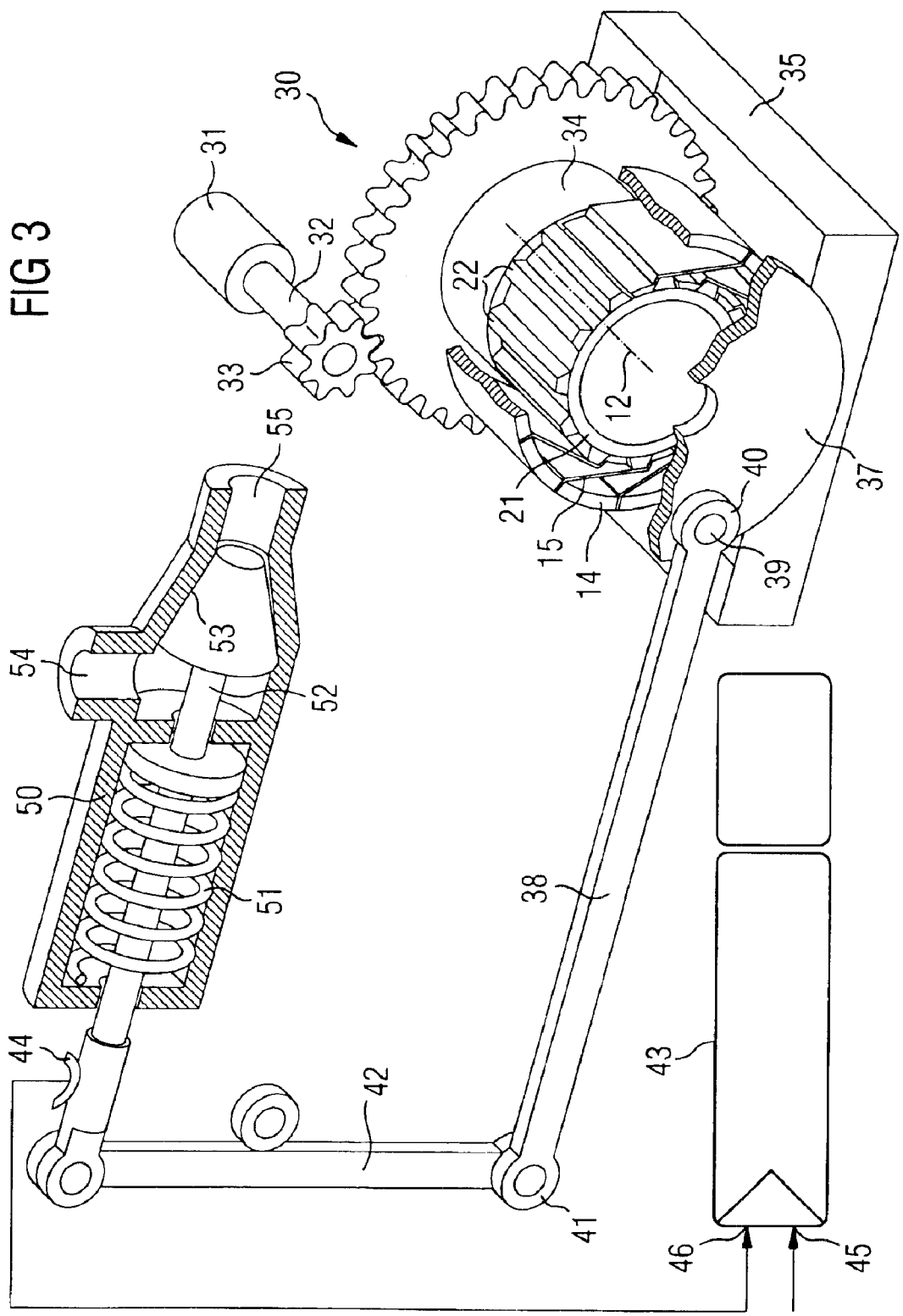
FIG. 3 is a schematic and partially vertical section of an electromechanical actuator connected to a valve in a close position.

In FIG. 3 a partially schematic and partially sectional view of an electomechanical actuator 30 connected to a valve 50 is shown. The valve 50 is preferably a control valve or an emergency shut down valve or a combined control and shut down valve of a steam turbine (not shown) for regulating the fresh steam directed to the steam turbine. The valve 50 includes a steam inlet 54 and a steam outlet 55, with a valve seat 53 in between. The valve 50 further includes a valve piston 52 which is forced by a valve spring 51 to be seated with an end portion on the valve seat 53 for closing the valve 50. Thus, the fluid connection between valve inlet 54 and valve outlet 55 is blocked. On the valve piston 52 a force acting against the force imposed by the valve spring 51 can be applied for axially moving the valve piston 52 in an open position of the valve 50 in a controlled way, for regulating the flow of steam through the valve 50.

For a controlled movement of the valve piston 52 it is connected to electromechanical actuator 30. The actuator 30 includes an electrical motor 31 with a motor shaft 32 and multi-stage gearing 33. The multi-stage gearing 33 has a gearing shaft 34 which is ridgely connected with the rotor element 11 of an electromagnetical radial lamella clutch 10 as described with reference to FIGS. 1 and 2. In fact in the shown embodiment the rotor element 11 and gearing shaft 34 form together one shaft. On the rotor element 11 a number of teeth elements 22 extending along the axis of rotation 12 are homogeneously distributed. The axis 12 is the symmetry axis of the rotor element 11 and the gearing shaft 34. The rotor element 11 is surrounded by a cylindrical element 14 which carries at its inner surface lamella elements 15. The cylindrical element 14 is at least partially immerged into an oil reservoir 35. The cylindrical element 14 may have some fins or other damping elements on its outer surface (not shown). The cylindrical element 14 is forced-fit connected, in particular rigidly connected to a crank disk 37 having a crank pin 39. At this crank pin 39 a push rod 38 is connected to the crank disk 37 with one of its end 40 (the crank-sited end).

With its other end 41 (the valve sited end) the push rod 38 is connected to a rocker arm 42. The rocker arm 42 is on the one side connected to the push rod 38 and on the other side to the valve piston 52. That rocker arm lever being connected to the push rod 38, has a greater arm length than the rocker arm lever connected to the valve piston 52. Due to the lever action therefore a small force acting on the push rod 38 generates a larger force acting on the valve piston 52 against the spring force of the closing valve spring 51. So for regulating the steam flow —which refers to actually shifting the valve piston 52—the clutch 11 has only to transmit a smaller momentum than without the rocker arm 52, which allows the manufacturing of a space saving clutch 11 and actuator 30.

The electrical motor 31 as well as the electrical coil 21 are controlled by a controller 43 which comprises a nominal valve input 45 and an actual valve input 46. These inputs 45 and 46 represent the nominal and actual value of the valve pistons 52 position. For determining the actual position of the valve piston 52 a position sensor 54 is located at the valve piston 52, for example between the rocker arm 42 and the valve 50. As the valve spring 51 imposes a spring force on the valve piston 52 to hold the valve 50 in a closed position no further momentum or force has to be imposed from the actuator 30 on the valve piston 52 for closing the valve 50. So in the example shown in FIG. 3 both the electrical motor 31 and the electrical coil 21 are de-activated. As the rotor element 11 is non-rotating the insertion portions 16 are engaged each in a respective recess 17 due to the pre-stressing of the lamella elements 15 with no electromagnetical force acting on the insertion portion 16.

In FIG. 4 the valve 50 and actuator 30 arrangement is shown with the valve 50 in a open position. In this case both electrical motor 31 and electrical coil 21 are activated so that the crank disk 37 is rotated into a position which leads to an axial movement of the push rod 38. By transforming this axial movement of the push rod 38 via the rocker arm 42 in an axial movement of the valve piston 52 the valve piston 52 is lifted off from the valve seat 53. So a fluid connection between the valve inlet 54 and the valve outlet 55 is established for allowing fresh steam to flow in the steam turbine. By use of the multi-stage gearing 33, the rotor element 11 coupled to the cylindrical element 14, the crank disk 37 connected with the push rod 38, which is connected over the rocker arm 42 with the valve piston 52, the torque of the electrical motor 31 is transformed into a force acting on the valve piston 52 against the spring force imposed on the valve piston 52 by the valve spring 51.

In case of an emergency closure of valve 50 both electrical motor 31 and electrical coil 21 are de-activated. Immediately after the activation of electrical motor 31 the spring force imposed on the valve piston 52 by the valve spring 51 initiates a movement of the valve piston 52 in a closure position. This movement of the valve piston 52 transformed in a rotation of the cylindrical element 14 of clutch 10. Due to the de-activation of the electrical coil 21 and the rotation of the cylindrical element 14 the insertion portion 16 of the lamella elements 15 are forced out of the recess 17 so that the cylindrical element 14 can rotate. As the cylindrical element 14 is at least partially immerged into the oil reservoir 35 a damping of the rotational motion of the cylindrical element 14 occurs. This damping ensures that the valve piston 52 does not hit or damage the valve seat 53. So due to the damping of the cylindrical element 14 the valve seat 53 is protected against a damage in case of an emergency closure of the valve piston 52.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An electromagnetical radial lamella clutch for an electromechanical actuator, comprising:
    a rotor element, including an axis of rotation and a circumferential outer surface area with at least one recess;
    a cylindrical element surrounding said rotor element;
    at least one lamella element, fastened to said cylindrical element and including an insertion portion placed in said recess;
    an electrical coil for holding said lamella element into said recess, wherein said insertion portion includes a magnetic material.

2. An electromagnetical radial lamella clutch according to claim 1, wherein said at least one lamella element is pre-stressed for mechanically inserting said insertion portion into said recess.

3. An electromagnetical radial lamella clutch according to claim 2, wherein said recess is a spacing between two teeth elements.

4. An electromagnetical radial lamella clutch for an electromechanical actuator, comprising:
    a rotor element, including an axis of rotation and a circumferential outer surface area with at least one recess;
    a cylindrical element surrounding said rotor element;
    at least one lamella element, fastened to said cylindrical element and including an insertion portion placed in said recess;
    an electrical coil for holding said lamella element into said recess, wherein said coil is wound around said rotor element.

5. An electromagnetical radial lamella clutch according to claim 4, wherein said recess includes a bottom section and a rising edge and wherein said insertion portion at least partially contacts said bottom section and said edge.

6. An electromagnetical radial lamella clutch according to claim 5, wherein said edge ends at a top section of said surface area and wherein said insertion portion at least partially contacts said top section.

7. An electromechanical actuator for a valve including a valve piston, comprising:
    an electrical motor;
    a radial electromagnetical clutch including,
        a rotor element including an axis of rotation and a circumferential outer surface area with at least one recess and being connectable to said electrical motor,
        a cylindrical element surrounding said rotor element,
        at least one lamella element fastened to said cylindrical element and including an insertion portion placed in said recess,
        an electrical coil for holding said lamella element into said recess, and
        a crank disk connected to said cylindrical element; and
    a push rod, being connected on one end with said crank disk and being connectable with the other end to said valve piston.

8. An electromechanical actuator according to claim 7, wherein said electrical motor is connectable to said rotor element via a gearing.

9. An electromechanical actuator according to claim 7, further comprising:
    an oil reservoir; and
    a damping device, connected to said clutch, whereby said damping device is at least partially immerged into said oil reservoir.

10. An electromechanical actuator according to claim 7, further comprising:
    a rocker arm being connected at one side to said other end of said push rod and being connectable with its other side to said valve piston.

11. An electromechanical actuator according to claim 7, connected to a valve including a valve piston, forced by a valve spring into a closed position and to be opened against a spring force of said valve spring.

12. An electromechanical actuator according to claim 7, wherein said electrical motor is connectable to said rotor element via a multi-stage gearing.

13. An electromechanical actuator according to claim 8, further comprising:
an oil reservoir; and
a damping device, connected to said clutch, whereby said damping device is at least partially immerged into said oil reservoir.

14. An electromechanical actuator according to claim 8, further comprising:
a rocker arm being connected at one side to said other end of said push rod and being connectable with its other side to said valve piston.

15. An electromechanical actuator according to claim 9, further comprising:
a rocket arm being connected at one side to said other end of said push rod and being connectable with its other side to said valve piston.

16. A turbine including a valve for regulating the flow of a fluid, the valve including a valve piston being connected to an electromechanical actuator, said actuator comprising:
an electrical motor;
a radial electromagnetical clutch, including
a rotor element, including an axis of rotation and a circumferential outer surface area with at least one recess, connectable to said electrical motor,
a cylindrical element surrounding said rotor element,
at least-one lamella element fastened to said cylindrical element and including an insertion portion placed in said recess,
an electrical coil for holding said lamella element into said recess, and
a crank disk connected to said cylindrical element; and
a push rod, connected on one end with said crank disk and on the other end with said valve piston.

17. The turbine of claim 16, wherein the turbine is a steam turbine.

18. The electromagnetical radial lamella clutch of for an electromechanical actuator, comprising:
a rotor element, including an axis of rotation and a circumferential outer surface area with at least one recess;
a cylindrical element surrounding said rotor element;
at least one lamella element, fastened to said cylindrical element and including an insertion portion placed in said recess;
an electrical coil for holding said lamella element into said recess, wherein the clutch is for a valve.

19. An electromagnetical radial lamella clutch for an electromechanical actuator, comprising:
a rotor element, including an axis of rotation and a circumferential outer surface area with at least one recess;
a cylindrical element surrounding said rotor element;
at least one lamella element, fastened to said cylindrical element and including an insertion portion placed in said recess;
an electrical coil for holding said lamella element into said recess, wherein said at least one lamella element is pre-stressed for mechanically inserting said insertion portion into said recess and wherein said insertion portion includes a magnetic material.

20. An electromagnetical radial lamella clutch according to claim 19, wherein said recess includes a bottom section and a rising edge and wherein said insertion portion at least partially contacts said bottom section and said edge.

21. An electromagnetical radial lamella clutch for an electromechanical actuator, comprising:
a rotor element, including an axis of rotation and a circumferential outer surface area with at least one recess;
a cylindrical element surrounding said rotor element;
at least one lamella element, fastened to said cylindrical element and including an insertion portion placed in said recess;
an electrical coil for holding said lamella element into said recess, wherein said at least one lamella element is pre-stressed for mechanically inserting said insertion portion into said recess and wherein said coil is wound around said rotor element.

* * * * *